United States Patent
Hines et al.

(10) Patent No.: US 8,939,855 B1
(45) Date of Patent: Jan. 27, 2015

(54) MOUNTING SYSTEMS, KITS AND METHODS OF CONVERTING AN ENGINE

(75) Inventors: Craig Hines, San Francisco, CA (US); Dustin Harlan Cram, San Jose, CA (US)

(73) Assignee: Balmar Acquistion LLC, Huntsville, AL (US)

( * ) Notice: Subject to any disclaimer, the term of this patent is extended or adjusted under 35 U.S.C. 154(b) by 699 days.

(21) Appl. No.: 12/625,234

(22) Filed: Nov. 24, 2009

Related U.S. Application Data

(60) Provisional application No. 61/117,782, filed on Nov. 25, 2008.

(51) Int. Cl.
F16H 55/00 (2006.01)

(52) U.S. Cl.
USPC .............................................. 474/47; 474/48

(58) Field of Classification Search
USPC ....................................... 474/47, 48
See application file for complete search history.

(56) References Cited

U.S. PATENT DOCUMENTS

| | | | | |
|---|---|---|---|---|
| 570,690 | A * | 11/1896 | Warren | 474/47 |
| 596,246 | A * | 12/1897 | Pease | 474/47 |
| 601,990 | A * | 4/1898 | Suter | 474/47 |
| 607,615 | A * | 7/1898 | Chickering | 74/433 |
| 697,577 | A * | 4/1902 | Wangerin | 474/47 |
| 1,371,512 | A * | 3/1921 | Nickerson | 474/48 |
| 1,400,200 | A | 12/1921 | Woolery | |
| 1,422,360 | A * | 7/1922 | Hughes | 474/48 |
| 1,565,469 | A * | 12/1925 | Kobert | 474/47 |
| 1,618,074 | A * | 2/1927 | Flory | 74/15 |
| 1,627,572 | A | 5/1927 | Olinger et al. | |
| 2,525,563 | A * | 10/1950 | Scott | 474/48 |
| 2,689,483 | A * | 9/1954 | Senna | 474/47 |
| 3,707,883 | A * | 1/1973 | Kamenick | 474/47 |
| 4,152,948 | A * | 5/1979 | LiDonnici | 474/47 |
| D267,471 | S | 1/1983 | Mundorf | |
| D292,391 | S | 10/1987 | Schlesch | |
| D297,707 | S | 9/1988 | Kanemitsu | |
| D308,013 | S | 5/1990 | Kanemitsu | |
| 4,960,476 | A * | 10/1990 | White et al. | 156/138 |
| D332,951 | S | 2/1993 | Seats | |
| D347,378 | S | 5/1994 | Warner | |
| 5,362,280 | A * | 11/1994 | Hirai et al. | 474/135 |
| D362,384 | S | 9/1995 | Middlebrook | |
| D375,471 | S | 11/1996 | Page, Jr. et al. | |
| 5,626,532 | A * | 5/1997 | Cerny | 474/168 |
| D459,197 | S | 6/2002 | Hodjat | |
| 6,669,135 | B1 | 12/2003 | Hartley | |
| D598,480 | S | 8/2009 | Kanemitsu | |
| 7,614,611 | B1 | 11/2009 | Walton et al. | |
| D621,240 | S | 8/2010 | Lutter et al. | |
| 7,874,411 | B2 | 1/2011 | Roberts et al. | |
| D654,778 | S | 2/2012 | Hines et al. | |
| 2004/0077445 | A1* | 4/2004 | Prior et al. | 474/133 |
| 2004/0145123 | A1 | 7/2004 | Hystad | |
| 2004/0178398 | A1 | 9/2004 | Miller et al. | |

* cited by examiner

*Primary Examiner* — Henry Liu
(74) *Attorney, Agent, or Firm* — Frijouf, Rust & Pyle P.A.

(57) ABSTRACT

The invention relates to devices and kits adapted and configured to convert engine systems to enable the engine to use wider belts. The engine systems suitable for conversion can include, for example, an internal combustion engine, an electric alternator driven by the engine from its mechanical power take off, all disposed in an engine compartment. The mechanical power take-off includes a belt pulley connected to a free end of an engine crankshaft.

6 Claims, 9 Drawing Sheets

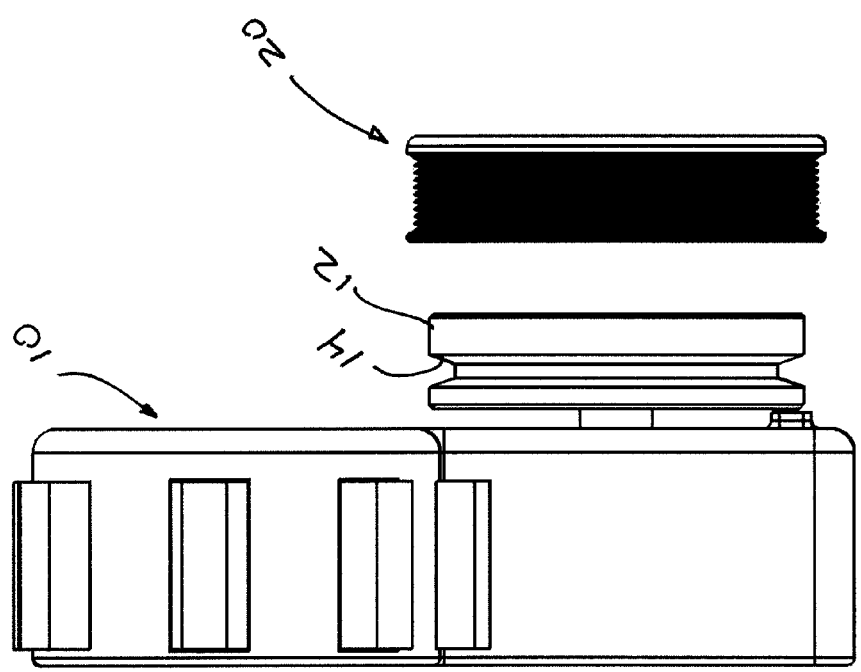

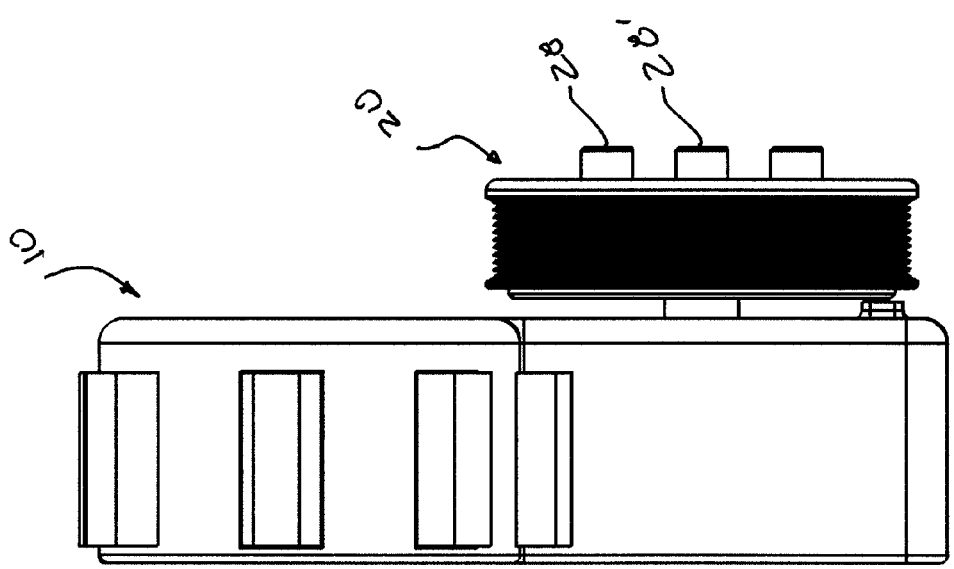

MOUNTING SYSTEMS, KITS AND METHODS OF CONVERTING AN ENGINE

CROSS-REFERENCE

This application claims the benefit of U.S. Provisional Application No. 61/117,782, filed Nov. 25, 2008, which application is incorporated herein by reference.

BACKGROUND OF THE INVENTION

Engines are used in a variety of situations from automotive to marine. Basic engine components are often similar from engine to engine. For example, alternators, water pumps and cooling fans are usually driven via a belt drive by a crankshaft of the engine. Consequently, a belt drive is normally mounted on the side of an engine perpendicular to the crank shaft, using a pulley/sheave system to drive other components. With a belt mechanical drive, the drive components always have a rotation speed which is dependent on the speed of the engine.

Common to methods in the field of mechanical drives is the sole facility to reduce or increase a rotation speed relative to that which would be produced by the engine crank shaft.

Engines are designed to provide pulleys and belts which control other aspects of the engine (such as fans and alternators). Converting an engine to use a different pulley or belt is a complicated and expensive endeavor. It would be beneficial to have devices, systems, assemblies, and means for mounting that enable a user to install and mount an alternator in a variety of situations and/or a more efficient pulley system replacing an existing one.

SUMMARY OF THE INVENTION

The invention relates to devices and kits adapted and configured to convert engine systems to enable the engine to use, for example, wider more efficient belts. The engine systems suitable for conversion can include, for example, an internal combustion engine, a water pump/cooler of a cooling circuit, an electric generator driven by the engine from a face of the engine which is other than that which faces the cooler, and a fan for moving air through the cooler, all disposed in an engine compartment. The output shaft of the alternator can be disposed in the engine compartment near a mechanical power take-off of the engine. The mechanical power take-off includes a belt pulley connected to a free end of an engine crankshaft.

An aspect of the invention is directed to a pulley or sheave adaptor. The pulley adaptor is typically configurable to have a substantially cylindrical shape having a first substantially planar surface, a grooved cylindrical side wall surface adaptable and configurable to engage a belt, and a second recessed surface opposing the first substantially planar surface wherein the adaptor has a height and a radius and further wherein the second recessed surface opposing the first substantially planar surface is adaptable and configurable to engage an existing engine pulley. Additionally, the second recessed surface can be flanked by perpendicular side walls defining a recess within which an engine pulley fits. The grooved cylindrical side wall can be configurable to have a single groove adaptable and configurable to accommodate a belt, or a plurality of grooves to accommodate a serpentine belt. Typically, the radius of the adaptor is greater than the height of the adaptor. Additionally, two or more apertures in the substantially planar first surface can be provided to facilitate securing the adaptor to the original engine crankshaft pulley. In some embodiments, there is a central aperture in the substantially planar first surface.

An additional aspect of the invention is directed to a method of modifying an engine. The methods include obtaining a pulley adaptor such as the ones described herein, placing the pulley adaptor over an existing engine pulley, and securing the pulley adaptor to the existing engine pulley. Additionally, two or more bolts can be used to secure the pulley adaptor to the existing engine pulley. Once the adaptor is in place, a user can obtain a belt, and then install the belt such that it is in communication with an alternator and the adaptor. The belts can be standard belts, multi-V or serpentine belts.

Still another aspect of the invention is directed to kits for converting an engine pulley system. The kits typically comprise a pulley adaptor, such as those described herein. Additionally, the kits can include one or more of each of the following: attachment mechanisms (such as bolts), washers, and belts.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2D is a bottom view of the pulley; FIG. 2E is a cross-sectional view of the pulley adaptor of FIG. 2D along the lines of A-A; FIG. 3B is a side view thereof; FIG. 3D is a side view thereof.

DETAILED DESCRIPTION OF THE INVENTION

Figure 1A:
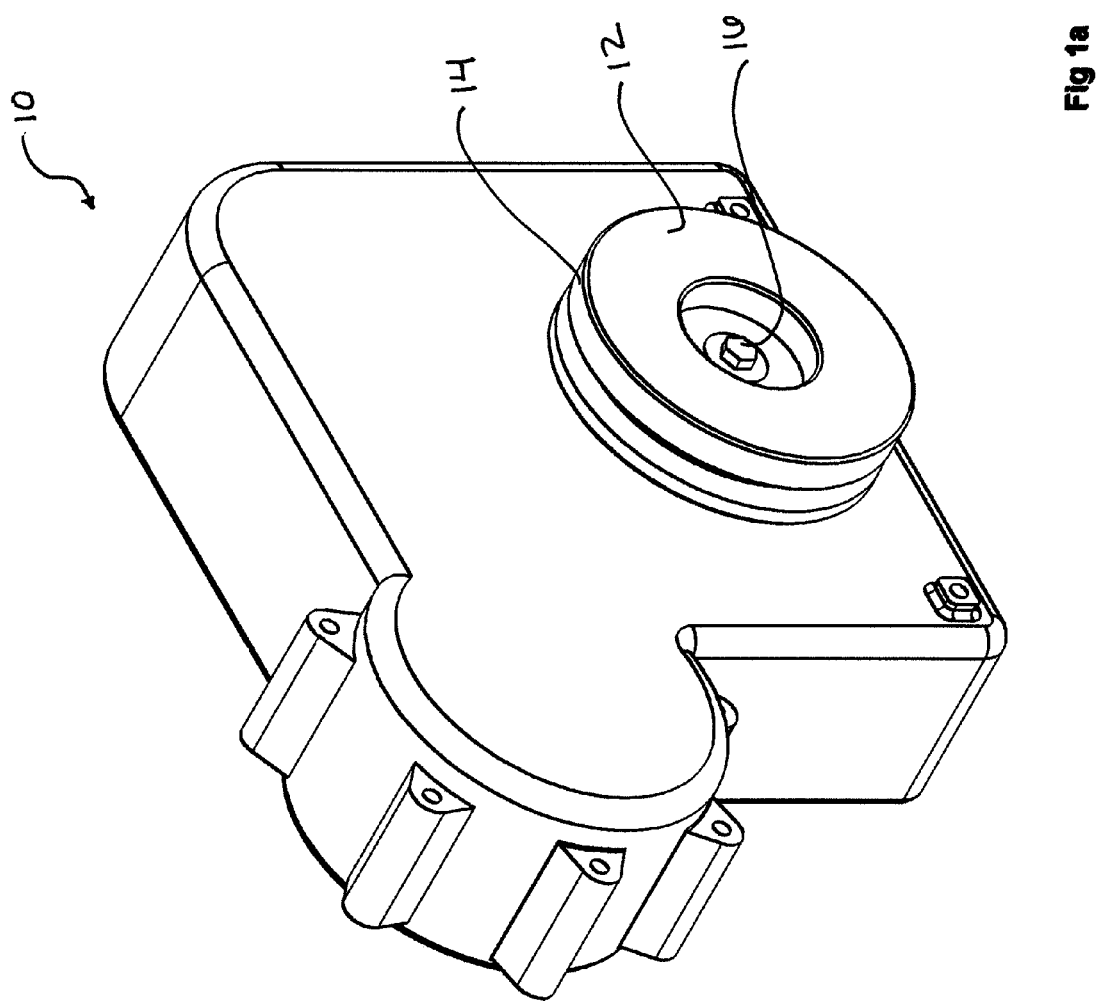
FIG. 1A is a perspective view of a portion of an engine block adapted and configured to have a pulley and belt communication therewith.
Figure 1B:
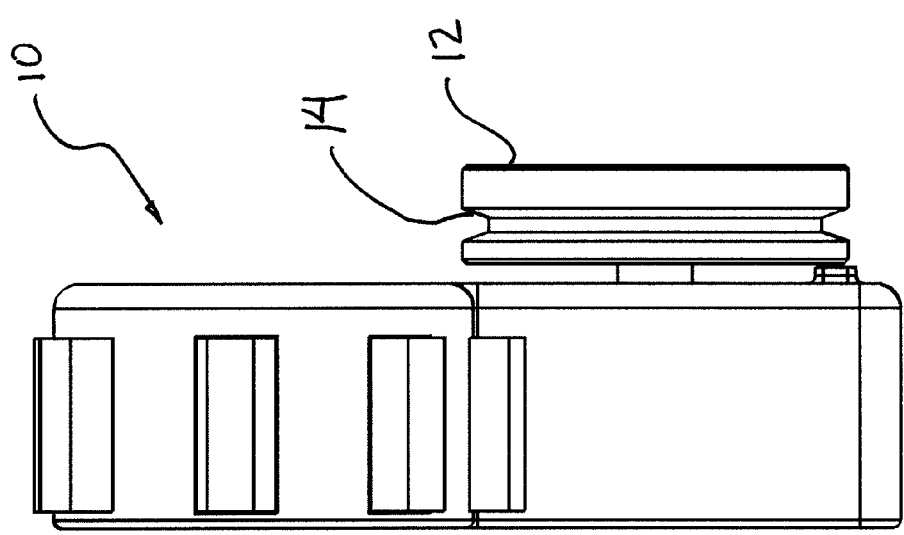
FIG. 1B is a side the engine block of FIG. 1A.

FIG. 1A is a perspective view of a portion of an engine block 10 adapted and configured to have a pulley 12 and belt (not shown) communication therewith. As is well known to those skilled in the art, belts are used in the engine to transmit power from the crankshaft to other rotating components of the engine. Depending on the design of the belts, belts can be subject to wear and loosening, thus requiring more maintenance. Engines are not currently adaptable to provide a mechanism to enable the use of different, or sturdier, belts. FIG. 1B is a side the engine block of FIG. 1A wherein a channel 14 is provided into which a belt fits. The pulley 12 is configured to be connected to the engine 10 using a suitable mechanism such as a center crank bolt 16.

Figure 2A:
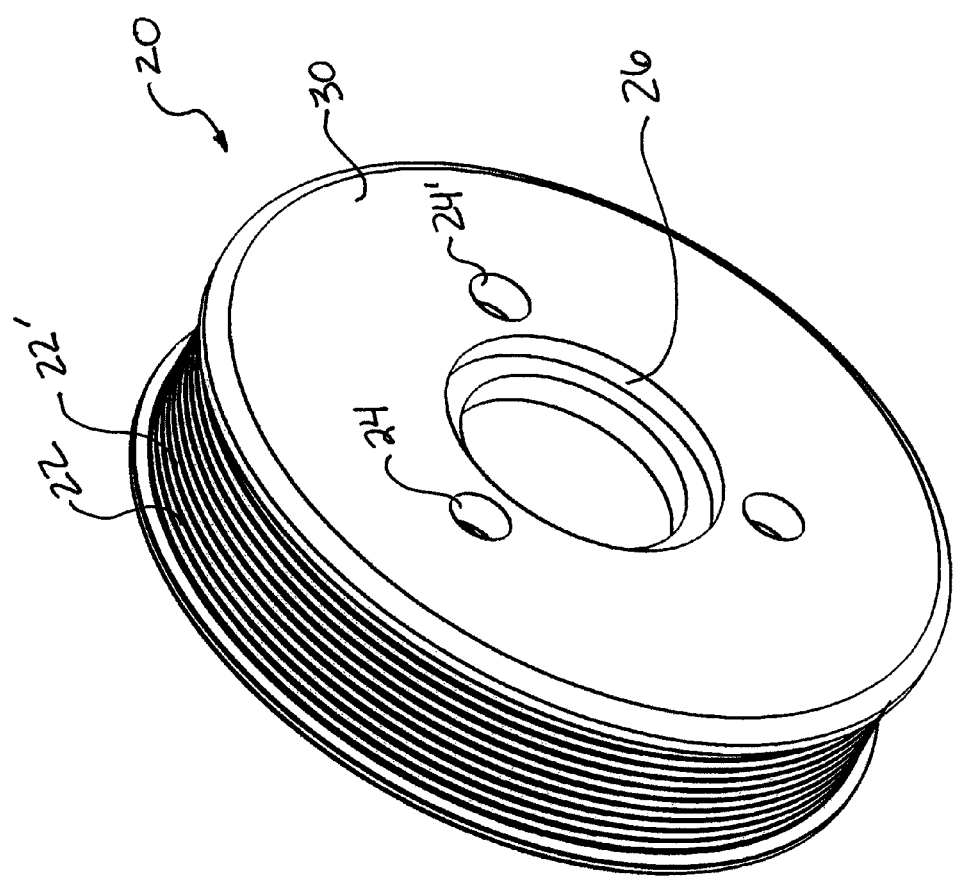
FIG. 2A is a perspective view of a serpentine pulley adaptor of the invention.

FIG. 2A is a perspective view of a substantially cylindrical serpentine pulley adaptor 20 having a height and a radius wherein the pulley adaptor 20 is further configured to have one or more channels 22, 22' circumferentially around the circumferential exterior of the pulley. Two or more apertures 24, 24 are provided on a substantially planar face of the cylindrical pulley adaptor to facilitate connecting the adaptor to an existing pulley, such as pulley 12 illustrated in FIG. 1. A central larger aperture 26 is also provided. The central aperture provides a basis for alignment of the adaptor to the engine block. Additionally, the central aperture can be used to facilitate adding additional pulleys. For example, a second alternator kit can be provided wherein the central aperture is used for providing alignment to the crank shaft and for providing access to a center crank bolt, such as center crank bolt 16 illustrated in FIG. 1A.

Figures 2B, 2C:
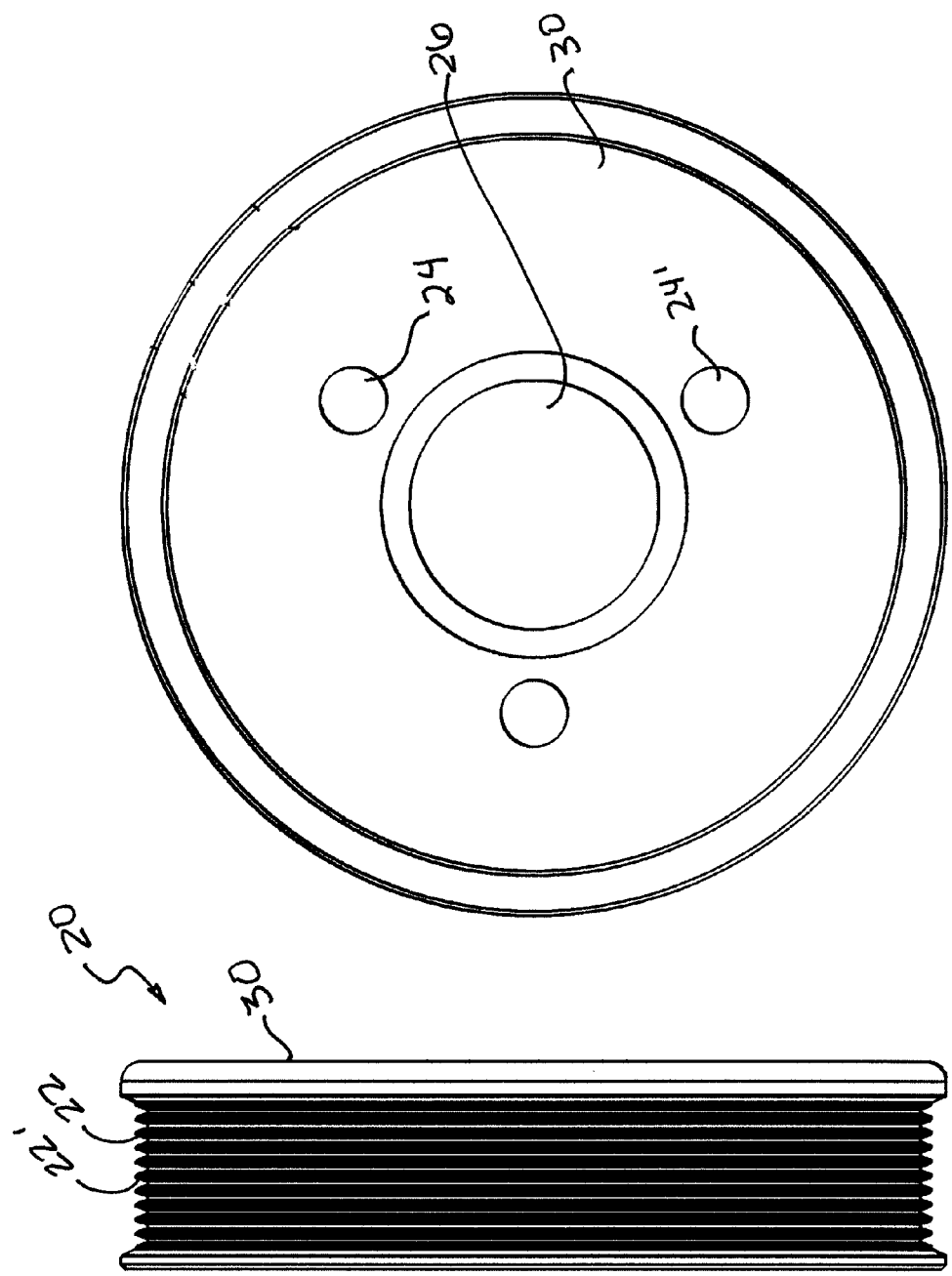
FIG. 2B is a side view of the pulley adaptor.
FIG. 2C is a top view of the pulley adaptor.
Figure 2C:
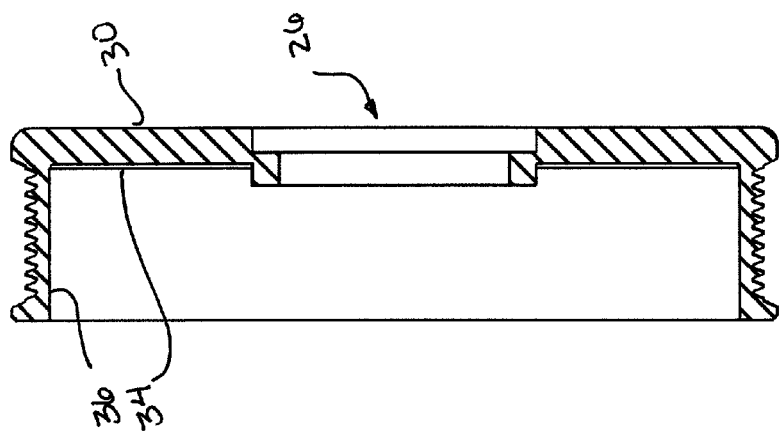
Figure 2B:
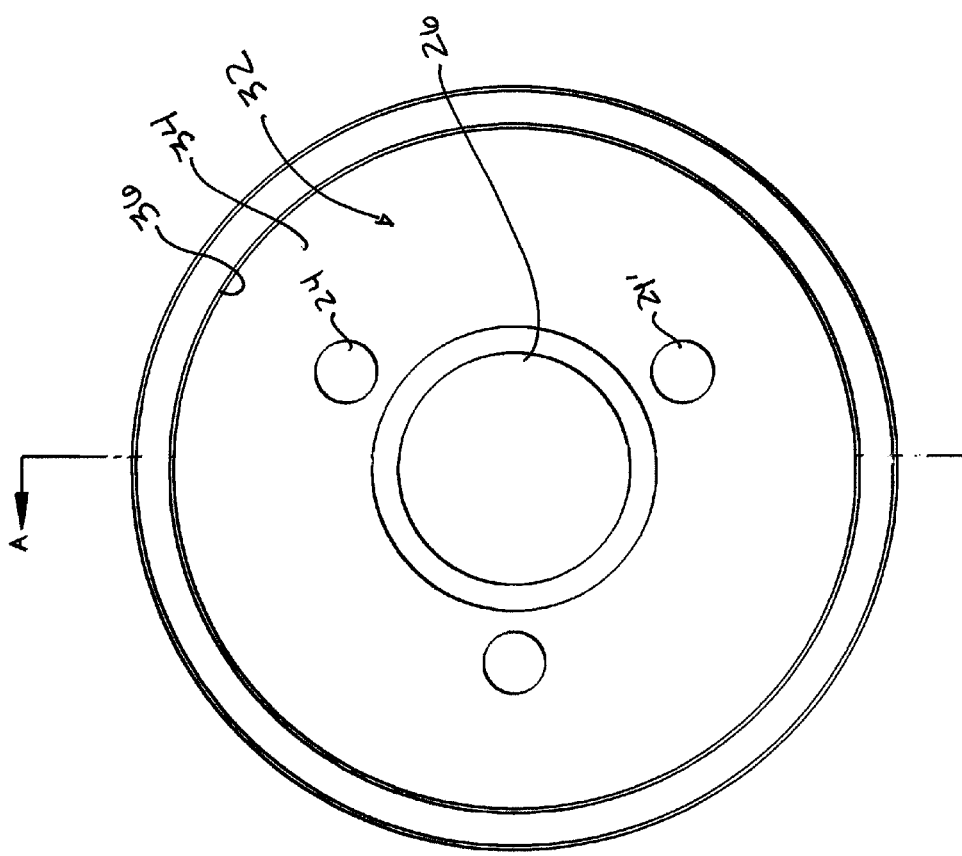

FIG. 2B is a side view of the pulley adaptor illustrated which illustrates the one or more channels 22, 22'. FIG. 2C is a top view of the pulley adaptor 20. The face 30 of the pulley adaptor 20 is generally planar as illustrated herein. FIG. 2D is a bottom view of the pulley wherein a trough 32 is configured to provide a bottom face 34 and a wall 36. FIG. 2E is a cross-sectional view of the pulley adaptor of FIG. 2D along the lines of A-A wherein the trough 32 formed on the rear surface of the pulley 20 is apparent. The trough 32 is adapted and configured to fit over the pulley 12 of an engine 10, such as that shown in FIG. 1. As illustrated, the trough 32 has perpendicular cylindrical walls. As will be appreciated by those skilled in the art, the size and configuration of the trough 32 can vary depending on the size, shape and configuration of the engine pulley being adapted. The pulley/sheave can be mounted on the existing pulleys, such that the alignment avoids vibrations from being off center.

Figure 3A:
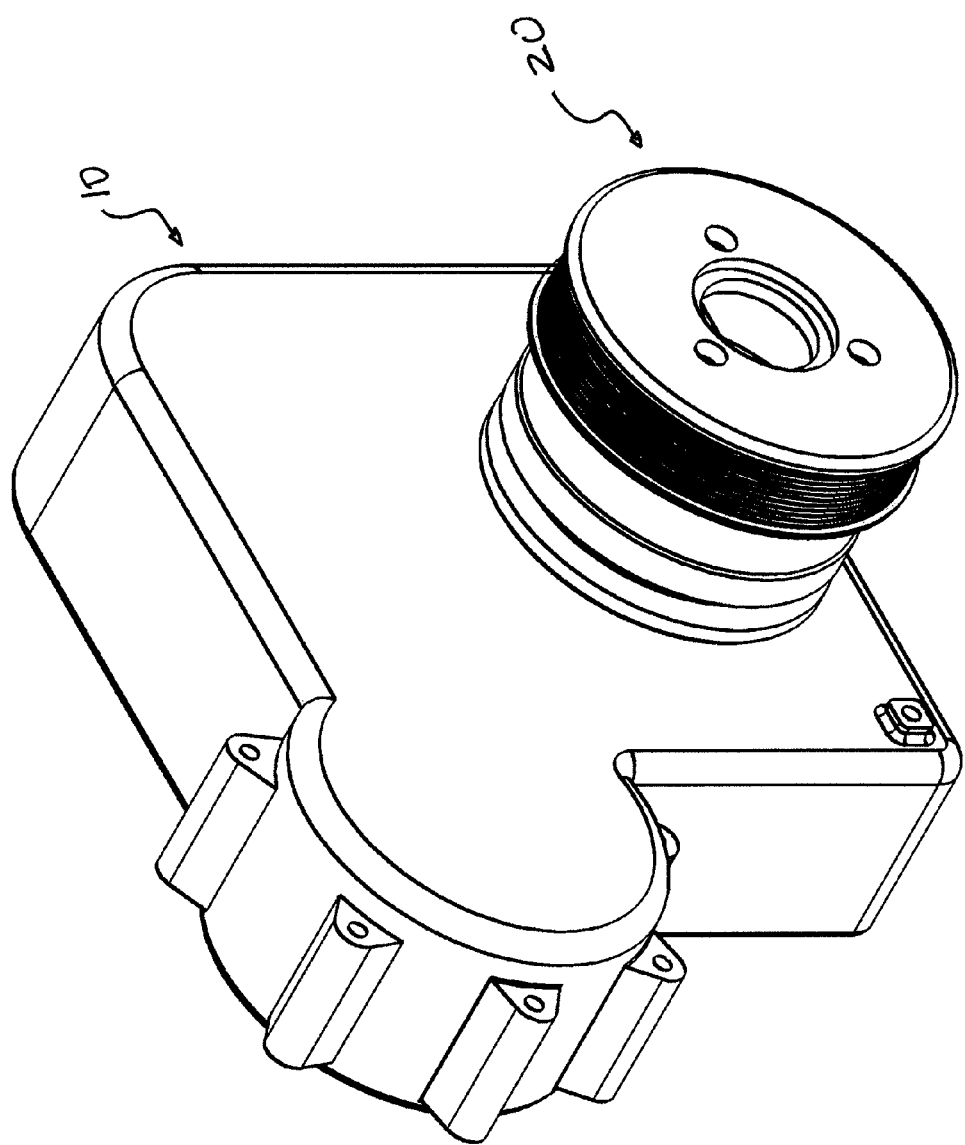
FIG. 3A is a perspective view of a pulley adaptor of FIG. 2 coming into contact with the engine block of FIG. 1.
Figure 3C:
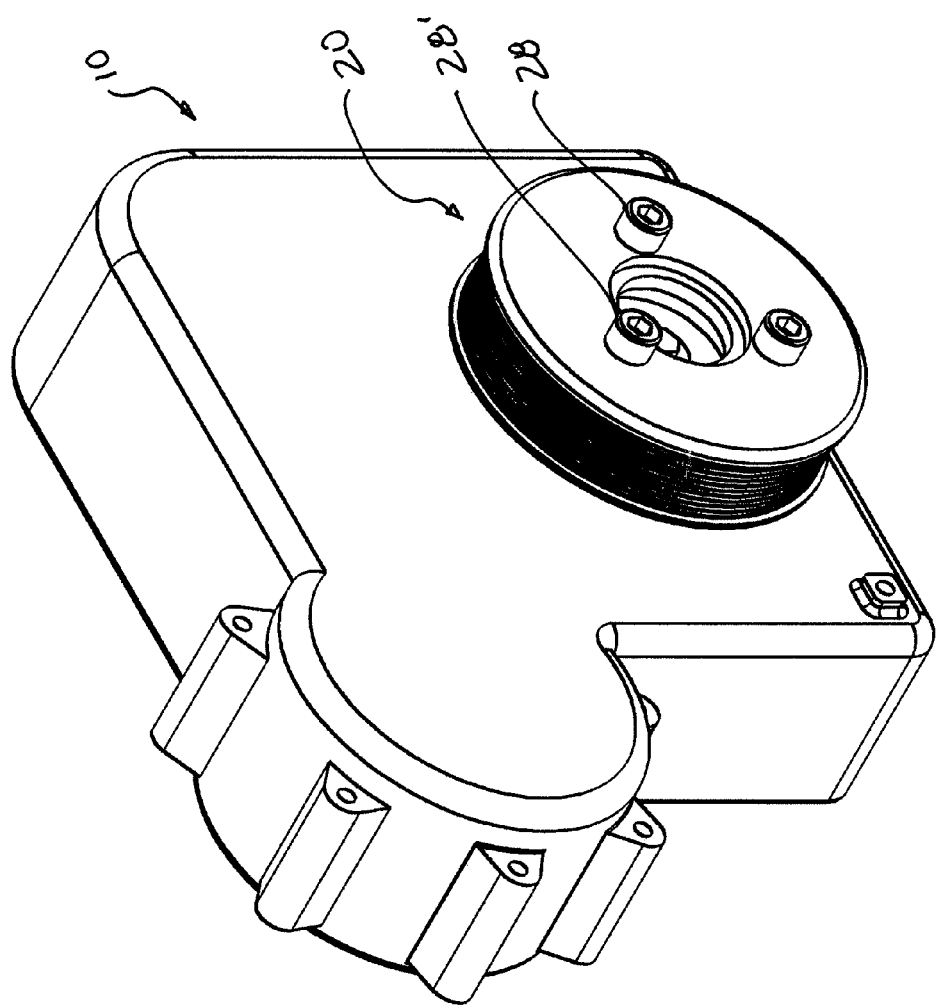
FIG. 3C is a perspective view of the pulley adaptor of FIG. 2 installed on the engine block of FIG. 1.

FIG. 3A is a perspective view of a pulley adaptor 20 of FIG. 2 coming into contact with the engine block 10 of FIG. 1 as would occur in a method of adapting an engine. As is appreciated by reviewing FIG. 3B, a side view thereof, the pulley adaptor 20 is sized such that it fits snugly over the pulley 10. This enables the pulley adaptor 20 to be engaged by the pulley 12 after the adaptor 20 is installed. Bolts are provided to attach to, for example, a marine engine block; adjustable axial alternator mount provides alignment for multiple engine models. Thus, a pulley can be mounted to existing engine pulley. The pulley is designed for a serpentine belt but can be replaced with a dual groove or a single groove belt such as a typical automotive fan belt, as would be appreciated by those skilled in the art. FIG. 3C is a perspective view of the pulley adaptor 20 of FIG. 2 installed on the engine 10 of FIG. 1 with the pulley adaptor 20 secured to the engine 10 by one or more attachers 28, illustrated here as bolts 28, 28'. FIG. 3D is a side view thereof.

The pulley adaptor can be made of any suitable material, including stainless steel, brass and aluminum. However, as will be appreciated by those skilled in the art, the pulley adaptor could also be made out of some of the more recent SLS and SLA processes using material such as 3D Systems (Valencia, Calif.) Duraform® EX (nylon 11) and Duraform® PA (nylon 12). The two pulleys are for multi groove serpentine belts and attach to the stock Yanmar® model 4JH4 marine engine. The turnbuckle is used as a tensioning devise for the alternator belt and one end is mounted to existing bolt holes in the Yanmar engine. The upper arm attachment is mounted to an existing area the Yanmar engine uses for a $2^{nd}$ alternator that Yanmar makes specifically.

As will be appreciated by those skilled in the art, the various components described herein can be put together in a kit for converting an engine pulley system. Kits typically would include a pulley adaptor, such as those described herein. Additionally, the kits can include one or more of each of the following: water pump pulley, alternator pulley, tensioning brackets, supporting hardware and attachment mechanisms (such as bolts), washers, and belts (including but not limited to standard belts, multi-V belts, and serpentine belts).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A pulley adaptor for installation on an existing engine pulley for converting an existing drive belt into a surpertine drive belt, the engine pulley mounted on a central drive shaft of the engine and defining an outer periphery, the engine pulley having an engine pulley depression located centrally in a side surface of the engine pulley with said engine pulley depression defining a radially inwardly facing engine pulley cylindrical surface; comprising a one piece pulley adaptor having a substantially cylindrical shape defining substantially planar surface having a first exterior surface and a second interior surface;

a central aperture defined in substantially said planar surface of said one piece pulley adaptor;

a cylindrical side wall of said substantially cylindrical shape extending from said second interior surface of said substantially planar surface having a height and an exterior surface to accommodated the serpentine drive belt;

a plurality of grooves defined in said exterior surface of said cylindrical side wall for engaging with the serpentine drive belt;

a recess defined in said second interior surface of said substantially planar surface of said one piece pulley adaptor dimensioned to overlay the outer periphery of the engine pulley;

a shoulder extending from said second interior surface of said substantially planar surface of said one piece pulley adaptor defining a radially outwardly facing pulley adapter cylindrical surface being received within the engine pulley depression of the engine pulley and with said radially outwardly facing pulley adapter cylindrical surface engaging with said radially inwardly facing existing pulley cylindrical surface for centering the one piece pulley adaptor relative to the existing engine pulley;

a plurality of through apertures extending through said substantially planar surface between said first exterior surface and said second interior surface of said planar surface of said one piece pulley adaptor; and a plurality of attachers extending through said plurality of through apertures of said one piece pulley adaptor for engaging with the engine pulley for securing said one piece pulley adaptor to the engine pulley.

2. The pulley adaptor of claim 1 wherein said plurality of attachers are bolts.

3. The pulley adaptor of claim 1 wherein said plurality of attachers being the sole means for securing said one piece pulley adaptor to the engine pulley.

4. The pulley adaptor of claim 1 wherein the radius of the pulley adaptor is greater than the height of the adaptor.

5. The pulley adaptor of claim 1 wherein the pulley adaptor is formed from an aluminum material to reduce weight of the pulley adaptor.

6. A pulley adaptor for installation on an existing pulley for converting an existing belt into a different belt, the existing pulley mounted on a central drive shaft with the existing defining an outer periphery, the existing pulley having an existing pulley depression located centrally in a side surface of the existing pulley with said existing pulley depression defining a radially inwardly facing existing pulley cylindrical surface; comprising;
    a one piece pulley adaptor having a substantially cylindrical shape defining substantially planar surface having a first exterior surface and a second interior surface;
    a central aperture defined in substantially said planar surface of said one piece pulley adaptor;
    a cylindrical side wall of said substantially cylindrical shape extending from said second interior surface of said substantially planar surface having a height and an exterior surface to accommodated the different belt;
    a groove defined in said exterior surface of said cylindrical side wall for engaging with the different belt;
    a recess defined in said second interior surface of said substantially planar surface of said one piece pulley adaptor dimensioned to overlay the outer periphery of the existing pulley;
    a shoulder extending from said second interior surface of said substantially planar surface of said one piece pulley adaptor defining a radially outwardly facing pulley adapter cylindrical surface for being received with the existing pulley depression of the existing pulley and for engaging with said radially inwardly facing existing pulley cylindrical surface for centering the one piece pulley adaptor relative to the existing pulley;
    a plurality of through apertures extending through said substantially planar surface between said first exterior surface and said second interior surface of said planar surface of said one piece pulley adaptor; and
    a plurality of attachers extending through said plurality of through apertures of said one piece pulley adaptor for engaging with the existing pulley for securing said one piece pulley adaptor to the existing pulley.

\* \* \* \* \*